Nov. 15, 1955 J. VEIT 2,723,424
APPARATUS FOR THE MANUFACTURE OF PATTERNED
THERMOPLASTIC STRIP MATERIAL
Original Filed May 27, 1948 3 Sheets—Sheet 2
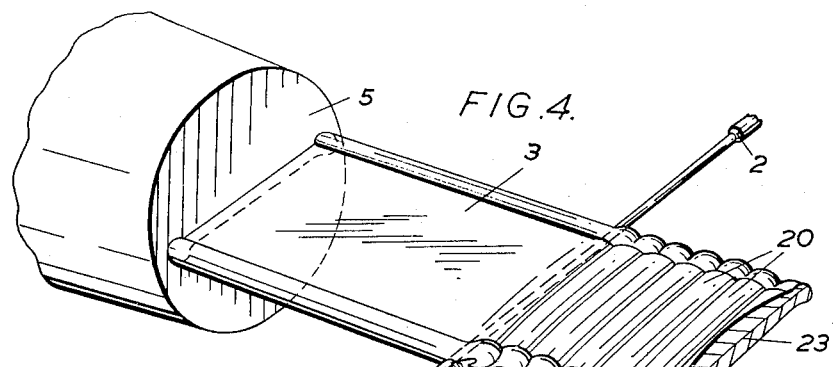
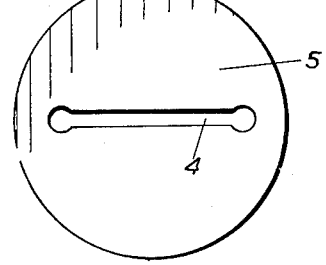
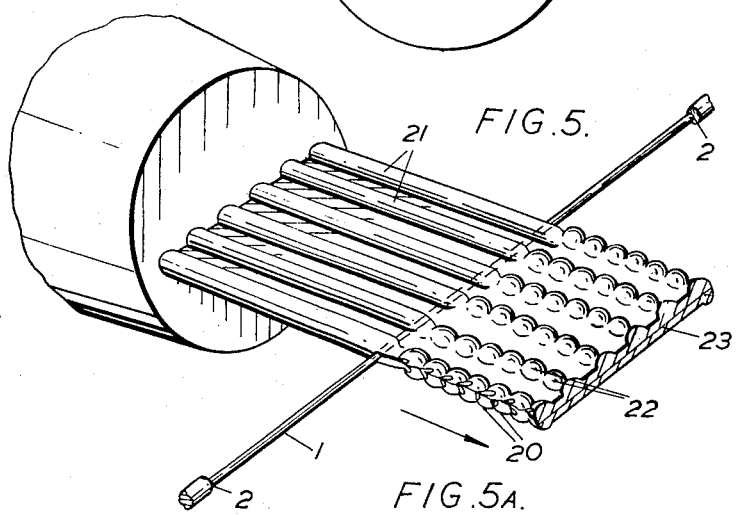
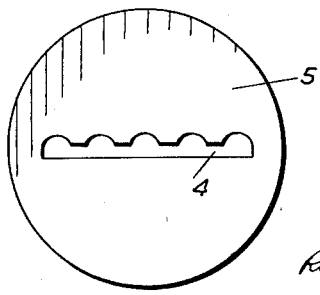
Inventor:
JULIUS VEIT, DECEASED
By GERTRUD VEIT, EXECUTRIX
By
Richardson, David and Nordon
Attorneys Nov. 15, 1955 J. VEIT 2,723,424
APPARATUS FOR THE MANUFACTURE OF PATTERNED
THERMOPLASTIC STRIP MATERIAL
Original Filed May 27, 1948 3 Sheets-Sheet 3
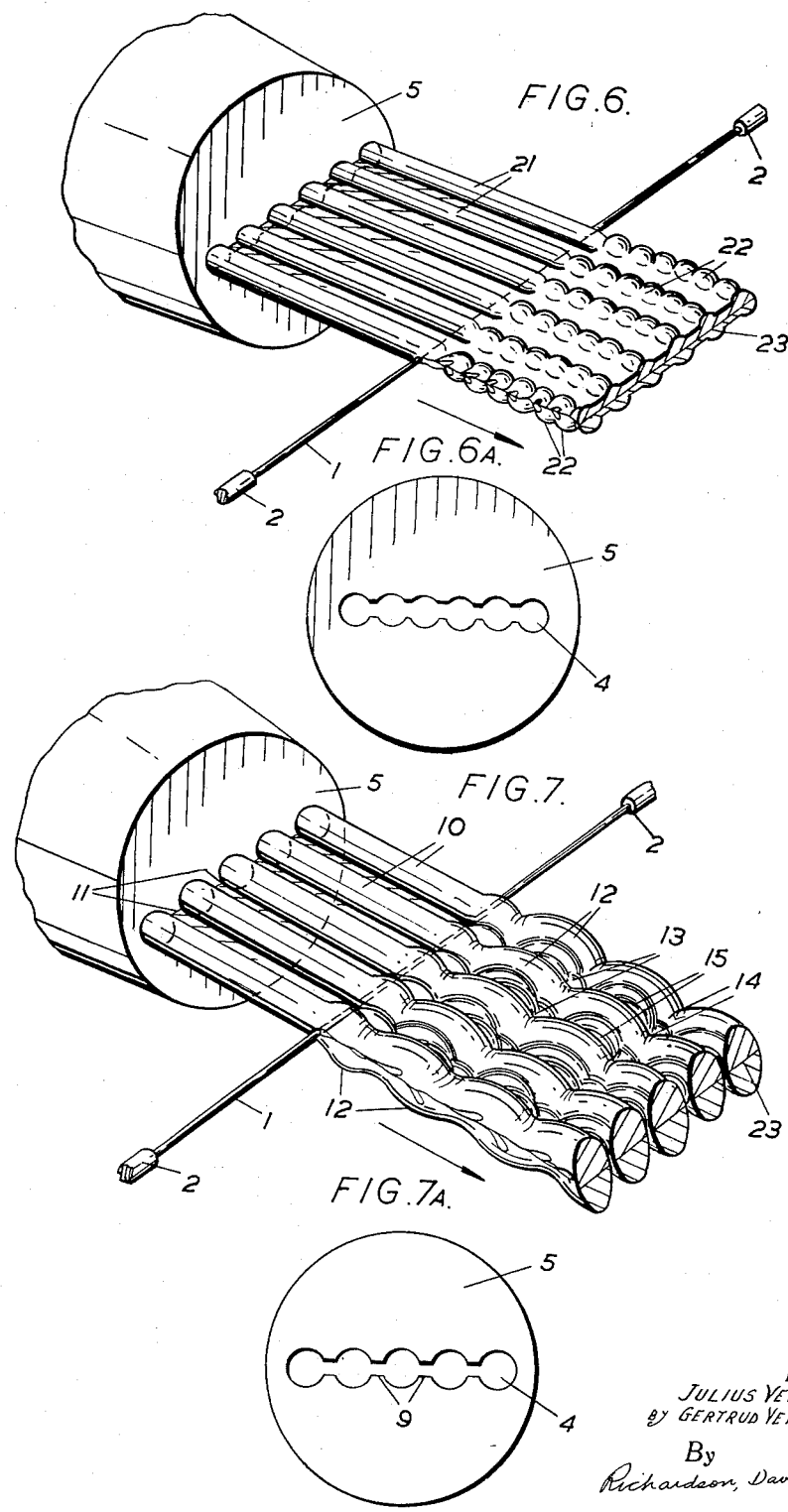
Inventor:
JULIUS VEIT, DECEASED
By GERTRUD VEIT, EXECUTRIX
By
Richardson, David and Vordon
Attorneys

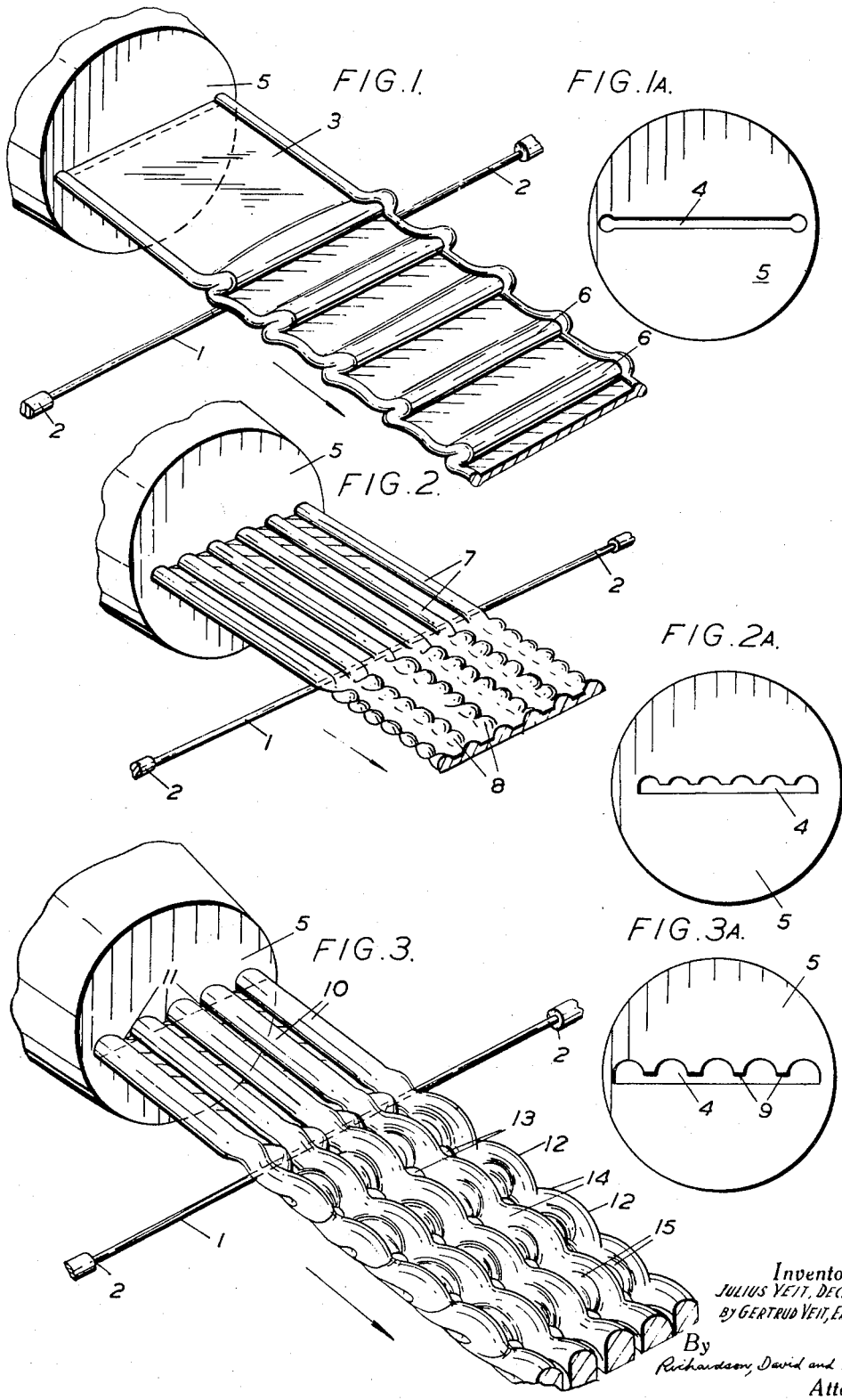

United States Patent Office 2,723,424
Patented Nov. 15, 1955

2,723,424

APPARATUS FOR THE MANUFACTURE OF PATTERNED THERMOPLASTIC STRIP MATERIAL

Julius Veit, deceased, late of Hounslow West, England, by Gertrud Veit, executrix, Hounslow West, England, assignor to Duratube & Wire Limited, Middlesex, England, a British company Original application May 27, 1948, Serial No. 29,545, now Patent No. 2,581,614, dated January 8, 1952. Divided and this application December 6, 1951, Serial No. 260,252

Claims priority, application Great Britain October 9, 1947

2 Claims. (Cl. 18—12)

This invention relates to the manufacture of patterned thermoplastic strip material.

This application is directed to material disclosed in U. S. Patent 2,581,614, issued on Jan. 8, 1952 to the same applicant, of which the present application is a division.

In the known method of manufacturing patterned thermoplastic strip material, a roller having a pattern on its periphery is so positioned with respect to the extrusion die for the thermoplastic strip material that the extruded material will, while still hot and soft, travel over the patterned periphery of the roller which is thus rotated and embosses the strip material with its pattern.

An object of the invention is to provide a novel method of manufacturing transversely ribbed thermoplastic strip material without the employment of an embossing roller.

A further object of the invention is the production, on thermoplastic strip material, of patterns that cannot be produced with the aid of an embossing roller.

With the aforesaid objects in view, apparatus according to the invention comprises an extrusion die having an elongated orifice adapted to form the strip material, and a straight, stationary obstructing element, longer than the width of the strip material to be formed, i. e. longer than the length of said orifice, the said element being arranged horizontally in front of, parallel to and spaced from the front surface of the said die and so that it will obstruct, without entirely interrupting, the normal free flow of the thermoplastic material while the latter is still in the hot and plastic condition. It has been found that this arrangement causes the production of transverse ribs or protuberances on the strip material.

In a preferred embodiment of the invention, the obstructing element is of linear form and thinner than the width of the orifice and is arranged to lie in a plane that passes medially through said orifice. The upper and lower parts into which the thermoplastic strip material is divided by this obstructing element come into contact with one another and re-unite while still hot and soft immediately after passing beyond the obstructing element.

In the case of one embodiment, by correspondingly shaping the extrusion orifice, the thermoplastic material may be caused to issue therefrom either as a flat strip or as a strip with longitudinal ribs thereon facing the obstructing element or on the side opposite thereto. With the flat strip, the obstructing element forms continuous transverse ribs, with the longitudinally ribbed strip, the obstructing element forms transverse ribs each of which is divided into a series of protuberances which are separated from one another by the distance between the longitudinal ribs from which they are formed.

The longitudinal ribs on the strip material may be formed by an extrusion orifice having rib-forming portions communicating with each other through comparatively narrow slots. The longitudinally ribbed strip material leaves the orifice with webs between the ribs, which webs are considerably thinner than the ribs. When the hot and plastic extruded material comes into contact with the obstructing element, the latter will obstruct the normal free flow of the thermoplastic material to a varying extent but, while it does not entirely interrupt the flow of the material constituting the longitudinal ribs but merely causes the corrugation or undulation of their surfaces, leaving a series of protuberances in each longitudinal rib, it entirely interrupts the thinner webs (which are made sufficiently thin for the purpose) at the positions adjacent to the depressions between the said protuberances, each transverse rib produced by the obstructing element being composed of protuberances which the obstructing element forms in the longitudinal ribs and which are separated from each other by uninterrupted web portions. The strip material is thus given a pattern of wickerwork appearance.

Strip material having corrugated or undulated longitudinal ribs and transverse ribs each of which is divided into a series of protuberances which are separated from each other by the distance between the longitudinal ribs from which they are formed may also be produced.

Preferably, the obstructing element is in the form of a wire or of a thin metallic rod or bar fixedly mounted at one end, or preferably, at both ends thereof.

In another embodiment of the invention, the obstructing element is arranged so that the part thereof that is in contact with the hot and plastic thermoplastic material lies entirely within the latter, preferably in the medial plane that is parallel to the faces of the strip. It will thus obstruct the normal free flow of the thermoplastic material and will produce transverse ribs on the two opposite faces of the strip.

In the case of this embodiment, also, the obstructing element is preferably in the form of a wire or of a thin metallic rod or bar fixedly mounted at one end or, preferably, at both ends thereof. The extruded strip of hot and soft thermoplastic material is divided by the obstructing element into two strips which come into contact with each other and adhere together while hot and soft immediately after passing beyond the obstructing element.

In the case of this embodiment, by correspondingly shaping the extrusion orifice, the thermoplastic material may be caused to issue therefrom either as a flat strip, as a strip with longitudinal ribs on one of its faces or as a strip with longitudinal ribs on both of its faces. With the flat strip, the obstructing element causes the formation of continuous transverse ribs on both of its faces and, with the longitudinally ribbed strip, the obstructing element causes the formation, on the longitudinally ribbed face or faces, of transverse ribs each of which is divided into a series of protuberances which are separated from one another by the distance between the longitudinal ribs from which they are formed; in the case of the strip having longitudinal strips on one face only, this formation will, of course, result only on the longitudinally ribbed face, the other face being formed with continuous transverse ribs only.

In another embodiment, the longitudinal ribs on the strip material may be formed by an extrusion orifice having rib-forming portions communicating with each other through comparatively narrow slots. The longitudinally ribbed strip material leaves the orifice with webs between the ribs, which webs are substantially thinner than the ribbed portions. When the extruded material comes into contact with the obstructing element, which, in this case, is arranged so that the part in contact with the hot and plastic thermoplastic material lies entirely within the ribbed portions and so as to pass through the connecting webs, the obstructing element will obstruct the normal free flow of the thermoplastic material to a varying extent but, while it does not entirely interrupt the flow of the material constituting the longitudinal ribs but merely causes the corrugation or undulation of their surfaces, leaving a series of protuberances in each longitudinal rib, it entirely interrupts the thinner webs (which are made sufficiently thin for the purpose) at the positions adjacent to the depressions between the said protuberances, each transverse rib produced by the obstructing element being composed of protuberances by which the obstructing element forms in the longitudinal ribs and which are separated from each other by uninterrupted web portions. If one face only of the strip material has been provided with longitudinal ribs, that face is, by this method, given a pattern of wickerwork appearance, whilst the other face is formed with continuous transverse ribs. If both faces of the strip material have been provided with longitudinal ribs, both faces are, by this method, given a pattern of wickerwork appearance. In either case, the extruded strip of hot and soft thermoplastic material is divided by the obstructing element into two strips which come into contact with each other and adhere together while still hot and soft immediately after passing beyond the obstructing element.

Strip material having, on each face, corrugated or undulated longitudinal ribs and transverse ribs, each of which is divided into a series of protuberances which are separated from each other by the distance between the longitudinal ribs from which they are formed may also be produced.

The invention is illustrated by way of example by the accompanying drawings, of which:

Fig. 1 shows in perspective the patterning of strip material issuing from the extrusion orifice as a flat strip, and Fig. 1A is a front elevation of the extrusion die;

Fig. 2 shows in perspective the patterning of strip material issuing from the extrusion orifice as a strip with longitudinal ribs thereon, and Fig. 2A is a front elevation of the extrusion die;

Fig. 3 shows in perspective the production of a wickerwork pattern on one side of the strip material, and Fig. 3A is a front elevation of the extrusion die;

Fig. 4 shows in perspective the patterning of both sides of strip material issuing from the extrusion orifice as a flat strip, and Fig. 4A is a front elevation of the extrusion die;

Fig. 5 shows in perspective the patterning of both sides of strip material issuing from the extrusion orifice with one side longitudinally ribbed and the other side flat, and Fig. 5A is a front elevation of the extrusion die;

Fig. 6 shows in perspective the patterning of both sides of strip material issuing from the extrusion orifice with both sides longitudinally ribbed, and Fig. 6A is a front elevation of the extrusion die; and Fig. 7 shows in perspective the production of a wickerwork pattern on both sides of the strip material, and Fig. 7A is a front elevation of the extrusion die.

In the example represented in Figs. 1 and 1A, the obstructing element is in the form of a wire or thin rod 1 (hereinafter referred to as a wire), as it is also in the case of the examples shown in all the other figures. The wire 1 is fixed at its ends 2. It lies on the outside of and in contact with the surface portion of the underside of the hot and plastic strip of thermoplastic material issuing from the extrusion orifice 4 (Fig. 1A) in the extrusion die 5. The wire 1 obstructs the normal free flow of the thermoplastic material to a varying extent and causes the production of ribs 6 thereon.

The example represented in Figs. 2 and 2A differs from that shown in Figs. 1 and 1A only in that the extrusion orifice 4 (Fig. 2A) is shaped to extrude the strip material with the upper surface formed with a number of longitudinal ribs 7 thereon. The wire 1 causes the formation of transverse ribs thereon each of which is divided into a service of protuberances 8 thereon which are separated from one another by the distance between the longitudinal ribs from which they are formed.

In the example represented in Figs. 3 and 3A, the extrusion orifice 4 (Fig. 3A) has rib-forming portions communicating with one another through narrow slots 9. The strip material with the longitudinal ribs 10 thereon leaves the orifice 4 with webs 11 between them, which webs are considerably thinner than the ribs 10. When the hot and plastic extruded material comes into contact with the wire 1, the latter will obstruct the normal free flow of the thermoplastic material to a varying extent but, while it does not entirely interrupt the material constituting the ribs 10 but merely causes the corrugation or undulation of their surfaces, leaving a series of protuberances 12 in each rib 10, it entirely interrupts the thin webs 11 (which are made sufficiently thin for this purpose) at the positions 13 adjacent to the depressions 14 between the protuberances 12, each transverse rib produced by the wire 1 being composed of protuberances 12 which are separated from each other by uninterrupted web portions 15. The strip material is thus given a pattern of wickerwork appearance.

In the example represented in Figs. 4 and 4A, the wire 1 is arranged so that the part thereof that is in contact with the hot and plastic thermoplastic material of the strip 3 lies entirely within the latter in the medial plane that is parallel to the faces of the strip 3. It will thus obstruct the normal flow of the thermoplastic material and will cause the production of transverse ribs 20 on the two opposite faces of the strip 3. The extruded strip 3 of hot and soft thermoplastic material is divided by wire 1 into two strips which come into contact with each other and adhere together while still hot and soft immediately after passing beyond the wire 1.

The example represented in Figs. 5 and 5A differs from that shown in Figs. 4 and 4A in that the extrusion orifice 4 (Fig. 5A) is shaped to extrude the strip material with the upper surface formed with a number of longitudinal ribs 21 and the lower face flat. The resulting strip will have, on its upper surface, longitudinal rows of protuberances 22, the said rows being separated from one another by the distance between the longitudinal ribs 21. The bottom face will be formed with transverse ribs 20.

The example represented in Figs. 6 and 6A differs from that shown in Figs. 4 and 4A in that the extrusion orifice 4 (Fig. 6A) is shaped to extrude the strip material with the upper and lower surfaces each formed with a number of longitudinal ribs 21. The resulting strip will have, on each of the said surfaces, longitudinal rows of protuberances 22, the said rows being separated from one another by the distance between the longitudinal ribs 21.

In the example represented in Figs. 7 and 7A, the extrusion orifice 4 (Fig. 7A) has rib-forming portions which communicate with one another through narrow slots 9 and are shaped to produce longitudinal ribs both on the top and bottom surfaces of the strip material. The strip material with the longitudinal ribs 10 on its top and bottom surfaces leaves the orifice 4 with webs 11 between them, which webs are considerably thinner than the ribs 10. The wire 1 is arranged so that the part thereof that is in contact with the hot and plastic thermoplastic material lies entirely within the ribbed portions and so as to pass through the connecting webs 11. When the hot and plastic extruded material comes into contact with the wire 1, the latter will obstruct the normal free flow of the thermoplastic material to a varying extent but, while it does not entirely interrupt the material constituting the rib 10 but merely causes the corrugation of undulation of their surfaces, leaving a series of protuberances 12 in the top and bottom of each rib 10, it entirely interrupts the thin webs 11 (which are made sufficiently thin for this purpose) at the positions 13 adjacent to the depressions 14 between the protuberances 12, each transverse rib produced by the wire 1 being composed of protuberances 12 which are separated from each other by uninterrupted web portions 15. The extruded strip of hot and soft thermoplastic material is divided by the wire 1 into two strips which come into contact with each other and adhere together while still hot and soft immediately after passing beyond the wire 1. The strip material produced has a pattern of wickerwork appearance on each face.

The strip material patterned as hereinbefore described may be passed, in the usual manner, over a guide roller on to a revolving drum on which it is wound.

Strip material patterned on both faces as hereinbefore described and as illustrated by Figs. 4 and 4A, Figs. 5 and 5A, Figs. 6 and 6A and Figs. 7 and 7A can readily be divided into two strips each having a patterned face. It has been found that, although the parts which adhere together immediately after passing beyond the wire 1 do so quite firmly, they can be separated from each other by being torn apart. On examining a transverse edge of this strip material a faint line of demarcation 23 between the two parts will be observed. After making a sufficiently deep incision along this line to enable the two parts to be grasped between the fingers, they can be readily torn apart.

I claim:

1. Apparatus for manufacturing thermoplastic strip material patterned with protuberances, comprising an extrusion die with an elongated horizontal extrusion orifice and a straight obstructing element, longer than the length of said orifice, arranged horizontally in front of, parallel to and spaced from said orifice at a distance equal to a plurality of said protuberances, the distance of said obstructing element from said orifice and its disposition with respect thereto being such that said obstructing element will obstruct the normal free flow of the thermoplastic strip material from said orifice while said thermoplastic strip material is suspended freely in the air and is still in the hot and soft condition.

2. Apparatus for manufacturing thermoplastic strip material patterned on both sides with protuberances, comprising an extrusion die with an elongated horizontal extrusion orifice and an obstructing element of linear form longer than the length of said orifice and thinner than the width of said orifice and arranged horizontally in front of, parallel to and spaced from said orifice at a distance equal to a plurality of said protuberances, and in a plane passing medially through said orifice, the distance of said obstructing element from said orifice and its disposition with respect thereto being such that said obstructing element will obstruct the normal free flow of the thermoplastic strip material from said orifice while said thermoplastic strip material is suspended freely in the air and is still in the hot and soft condition.

References Cited in the file of this patent

UNITED STATES PATENTS

| | | |
|---|---|---|
| 1,193,870 | Butterworth | Aug. 8, 1916 |
| 1,218,473 | Root | Mar. 6, 1917 |
| 1,422,356 | Heller | July 11, 1922 |
| 1,856,055 | Hervey | Apr. 26, 1932 |
| 2,581,614 | Veit | Jan. 8, 1952 |